United States Patent [19]

Kresock

[11] Patent Number: 5,666,032
[45] Date of Patent: Sep. 9, 1997

[54] LINEAR SCAN CONTROL FOR A CRT DISPLAY SYSTEM

[75] Inventor: John Michael Kresock, Elba, N.Y.

[73] Assignee: Eastman Kodak Company, Rochester, N.Y.

[21] Appl. No.: 362,060

[22] Filed: Dec. 22, 1994

[51] Int. Cl.[6] ..................................................... H01Q 3/00
[52] U.S. Cl. ........................... 315/370; 315/408; 315/403
[58] Field of Search ................................... 315/370, 408, 315/403

[56] References Cited

U.S. PATENT DOCUMENTS

| | | |
|---|---|---|
| 3,689,797 | 9/1972 | Hetterscheid et al. |
| 3,784,857 | 1/1974 | Christopher. |
| 3,988,638 | 10/1976 | Nillesen ............................ 315/388 |
| 4,142,132 | 2/1979 | Harte ................................ 315/370 |
| 4,687,974 | 8/1987 | Miyakawa ........................ 315/375 |
| 4,777,411 | 10/1988 | O'Connor et al. ............... 315/371 |
| 4,980,614 | 12/1990 | Yamada et al. . |
| 5,013,978 | 5/1991 | Macaulay ......................... 315/367 |
| 5,345,152 | 9/1994 | Wilber ............................... 315/371 |

FOREIGN PATENT DOCUMENTS

| | | |
|---|---|---|
| 0 587 510 A2 | 9/1992 | European Pat. Off. . |
| 62-254574 | 6/1987 | Japan . |
| 2 272 340 | 5/1994 | United Kingdom . |

OTHER PUBLICATIONS

"Suppression of Horizontal Deflection Current Ringing", IBM Technical Disclosure Bulletin, vol. 29, No. 10, Mar. 1987, pp. 4456–4458.

*Primary Examiner*—Theodore M. Blum
*Attorney, Agent, or Firm*—Francis H. Boos, Jr.

[57] ABSTRACT

In a highly accurate linear scan control for a CRT image display system useful for reproducing photographic images, distortion effects produced by system transients resulting from deflection drive amplifier circuits, are eliminated by introducing a step incremental increase in the input drive waveform at the start of the trace (scan) interval following the end of the retrace interval.

9 Claims, 4 Drawing Sheets

LINEAR SCAN CONTROL FOR A CRT DISPLAY SYSTEM

FIELD OF THE INVENTION

The invention relates generally to the field of cathode ray tube (CRT) image display systems, and in particular to scan control circuits for producing highly linear beam scanning in the CRT.

BACKGROUND OF THE INVENTION

Photographic printing systems have been developed which use three sequential monochrome image displays on a CRT to expose high resolution images onto photographic paper for subsequent development into a color photographic print. Typically, red, green and blue image signals are applied sequentially to the CRT to control the intensity of an electron beam which is raster scanned across a monochrome phosphor screen. A rotating color filter wheel converts the three monochrome image fields into a full color image which is projected onto the photographic paper. It is critical in a color photographic printing system of this type to produce a highly linear scan of the electron beam on the CRT screen in order to produce high resolution photographic images without artifacts introduced by a non-linear beam scan.

It is well known that flyback type of beam scan control circuits typically found in television image reproduction are limited in achieving the linearity required for photographic printing. It is also known to use controlled analog amplifier drive circuits to drive CRT deflection coils to produce highly linear beam scan. An example using digital control of deflection drive amplifiers is found in U.S. Pat. Nos. 4,142,132 and 4,687,974, in which beam position on the face of the screen is controlled according to digital position values stored in a lookup table. In this way, the beam is incrementally advanced across the face of the tube to positions determined by position values stored in the lookup table. By suitably programming these values into the table, a highly linear beam scan can be produced.

Even given this basic scan control scheme, it is difficult to produce low distortion deflection wave forms in a precision electrical scan system providing a significant amount of scan power. The difficulty is greater in higher speed scan systems. It has been found that the most difficult portion of the scan waveform to produce accurately is the region at the beginning of the scan interval immediately following the end of the retrace interval. This region brings system transient response characteristics into play, particularly those resulting from transient response characteristic of the analog amplifier circuit or circuits used to drive the CRT deflection yoke. Additionally, for reasons of production economics, the desired low distortion deflection wave form characteristics must be repeatable for all systems being produced, i.e. the solution to producing the highly linear deflection, particularly at the initial scan region, should be such as to be forgiving of reasonable tolerance variations among different CRT systems.

A well known technique of compensating for start of scan transient response nonlinearity involves modifying the scan drive waveform with an inverse curve shape of the waveform distortion. An example of this type of compensation technique applied during the entire scan interval is found in U.S. Pat. No. 5,013,978. This technique has been found, in actual application, to be inadequate for good control, i.e. elimination, of start-of-scan nonlinearity. It was found that this was due, in part, to the fact that circuit transient response at the start of scan was not identical in each machine and thus a uniform compensating waveform was not suitable for a plurality of CRT systems, even though of the same design. The alternative of developing individual compensating waveforms for each system is impractical and too costly. Moreover, a new waveform would have to be supplied any time parts of the CRT system are replaced during repairs.

It is therefore desirable to provide an improved form of linear scan control for a CRT display system which avoids the problems just discussed.

SUMMARY OF THE INVENTION

In accordance with the invention therefore, there is provided an improved linear scan control for a CRT display system of the type having an analog amplifier circuit responsive to an input signal with scan and retrace intervals for driving a deflection yoke of a CRT display wherein initial scan position is subject to a nonlinear distortion resulting from transient response characteristics of the analog amplifier circuit. The improvement of the invention comprises means for supplying a step signal to the analog amplifier circuit at the start of the scan interval wherein the step signal is of an amplitude and polarity that substantially eliminates the nonlinear scan distortion. The principal distortion effect is found to be a lagging, i.e. negative, deviation from the desired linear scan characteristic. Thus the polarity of the step input would be in the positive direction. The requisite amplitude to achieve elimination of the initial distortion is readily determined empirically be mapping actual scan results for incrementally increased step amplitudes until the desired results are achieved.

With this simple and effective modification of the input drive waveform to the deflection amplifier drive circuits, it has been found that a high degree of scan linearity is achieved and the linearity is highly uniform among different CRT display systems of the same design.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
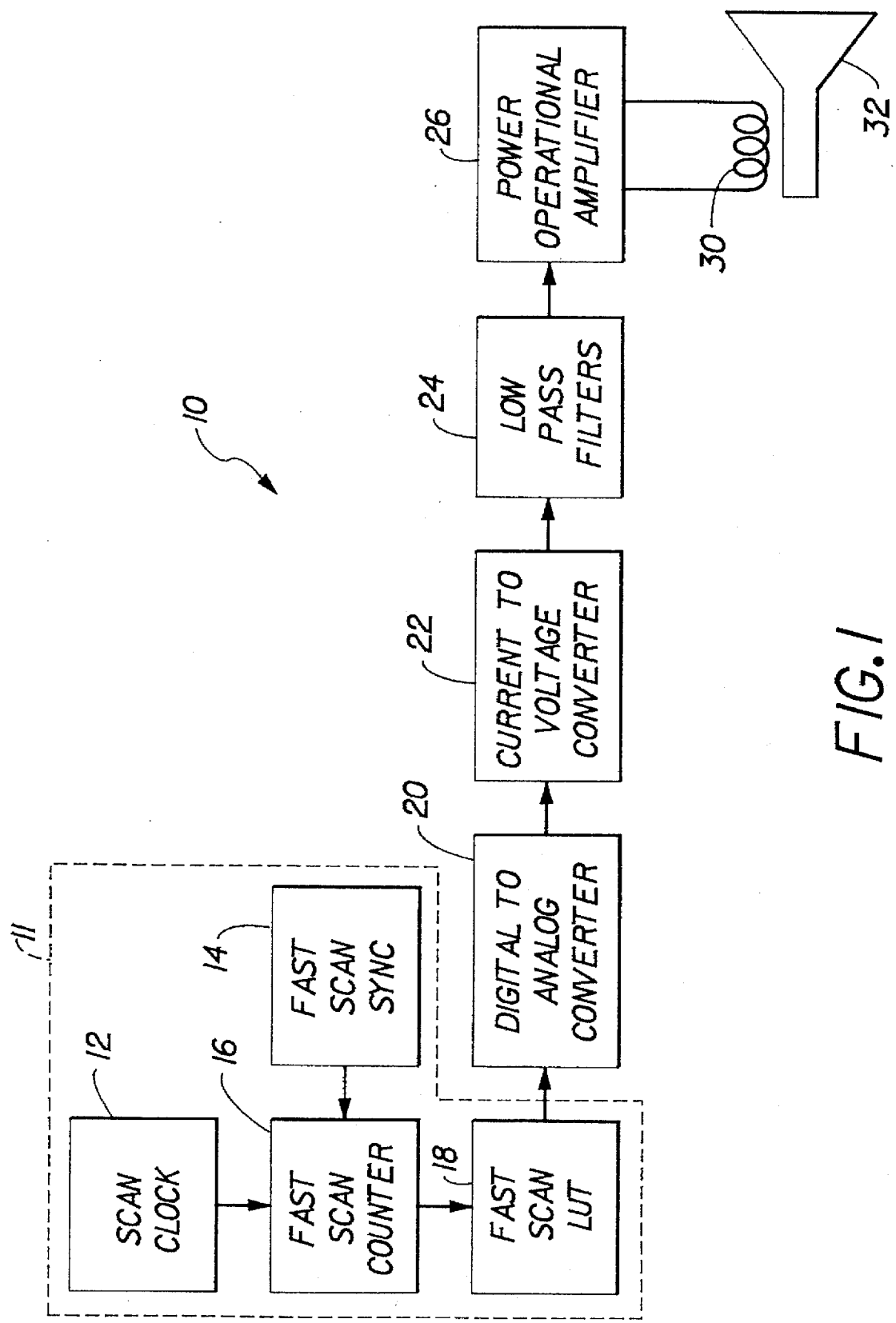
FIG. 1 is a block diagram of a portion of a CRT display system embodying a digital linear scan control according to one embodiment of the present invention.

Referring to FIG. 1, a block diagram of a fast scan portion of a CRT image display system 10 is shown. The illustrated system is comprised of a scan waveform generating circuit 11 including a scan clock 12 operating at a frequency of, for example, 28 MHz, which outputs a clock signal to a 12 bit fast scan counter 16. This counter operates to count through a 4096 count cycle with reset synchronized by a line sync signal from fast scan sync supply 14. Counter 16 divides the 28 MHz clock signal by 4096 to produce a fast scan cycle frequency of 6.836 KHz. The output of counter 16 is applied to a lookup table (LUT) 18 to address digital values stored therein representing scan current levels used to generate a fast scan waveform. LUT 18 may comprise conventional EPROMS with 4096 time steps per scan cycle with corresponding scan current levels programmed therein. The output of LUT 18 is applied to digital to analog converter 20 for conversion of the digital LUT values to an analog current waveform. This current waveform is converted to a voltage waveform in current to voltage converter 22, then passed through one or more low pass filters 24 and applied to the input of power operational amplifier circuit 26. The output of the amplifier 26 is then applied to the fast scan winding 30 of the deflection yoke for CRT 32.

Figure 2:
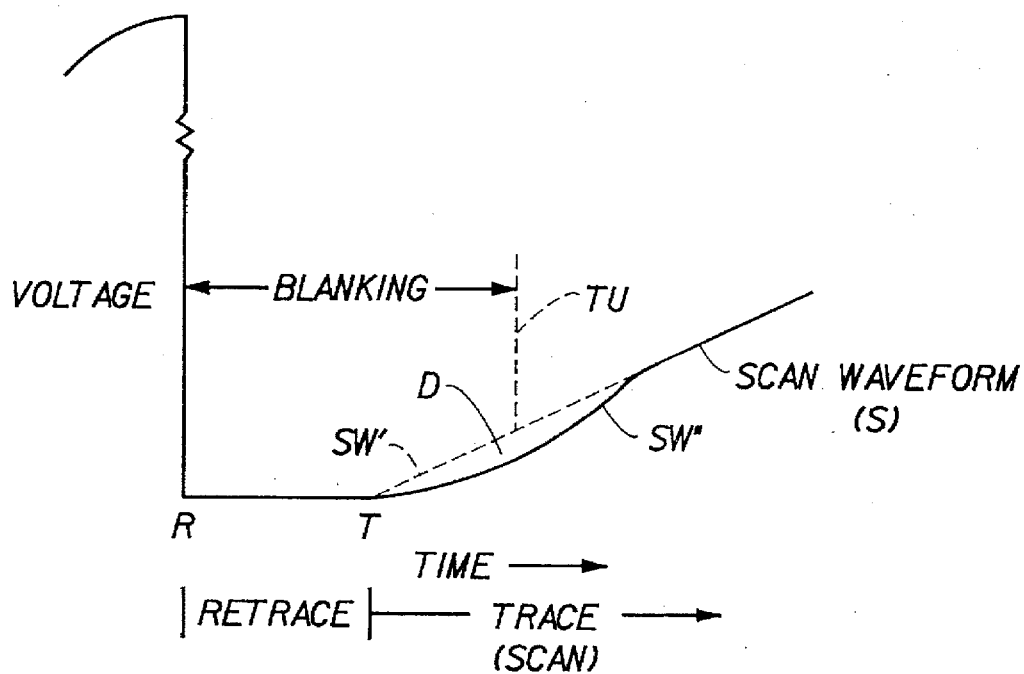
FIGS. 2 and 3 are graphs of scan waveforms illustrating the operation of the invention.
Figure 4:
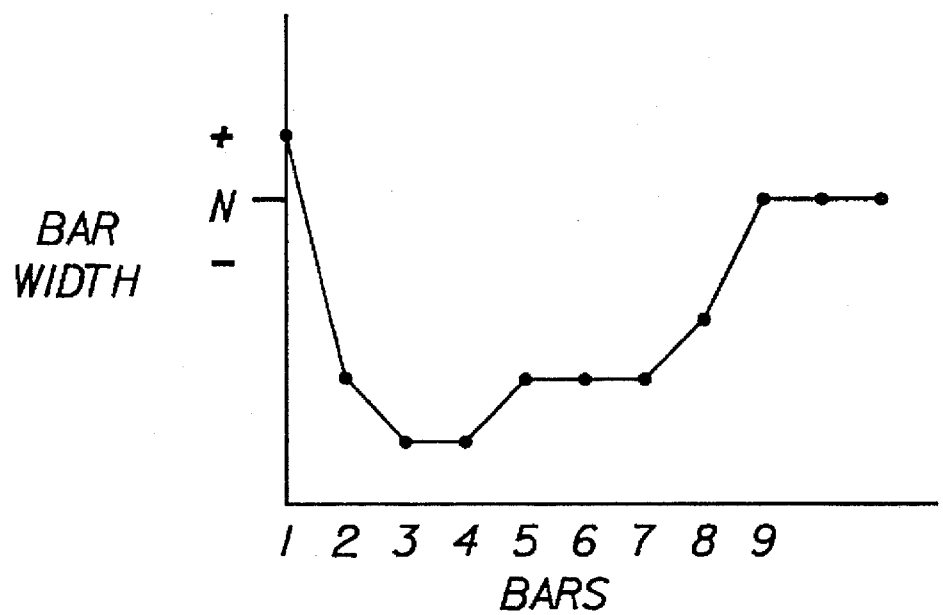
FIGS. 4 and 5 are plots of scan widths versus scan position illustrating the improvement in linear scan control achieved by the invention.

Referring now to FIG. 2, there is shown a representative scan waveform generated by the system of FIG. 1. At the conclusion of a previous scan corresponding at point (R) in time, the sync signal from circuit 14 resets counter 16 causing LUT 18 to drive the current output of converter 20 from a high to a low value thus initiating a retrace period from (R) to (T) during which time the CRT beam rapidly moves from the extreme end of the previous scan line at one side of the CRT screen to the beginning of the next scan line at the other side of the screen. At the end of the retrace interval, beam scan, i.e. "trace", is initiated in accordance with the digital values from LUT 18 which control the pixel-by-pixel position of the CRT beam during trace and the beam position is incrementally moved across the phosphor screen. It is conventional practice to suppress beam current in the CRT for a period of time, referred to as the blanking interval, to allow transients in the circuits to settle out. Ideally, the scan waveform (SW) during the initial stage of beam scan would be such as would produce an accurate linear scan of the beam across the phosphor screen. This is represented by an ideal waveform illustrated by dotted segment (SW') beginning during the later stage of the blanking interval and continuing through the start of useful scan (TU) when the beam is unblanked. In practice, however, it has been found that circuit transients, primarily resulting from transient operating characteristics of operational amplifier 26, cause scan waveform distortion which result in a lagging waveform characteristic (SW") which, at the start-of-useful-scan TU is typically below the ideal waveform (SW'). While the drive amplifier is primarily responsible for this transient effect, other circuits leading to the amplifier may also contribute to the distortion effect. For example, the low pass filters 24 used to smooth out some of the digital effects in the input scan Waveform may also contribute to the distortion effect. Other circuits may also contribute. The effect of this waveform distortion on beam scan linearity can be seen in FIG. 4, which graphically illustrates beam position versus time. This graph is created by measuring a grid of equal width lines, as reproduced on the CRT screen, at equal time intervals along the fast scan line. The effect of the waveform distortion is seen as a signification deviation of the beam widths from a nominal standard width (N). While it is possible, as previously described, to substantially eliminate this nonlinearity by programming the LUT 18 to introduce compensating values that would bring the actual waveform (SW") up to the ideal waveform (SW'), such an arrangement is specific to a particular display system and would not be universally applicable to other display systems even though of the same design.

Figure 3:
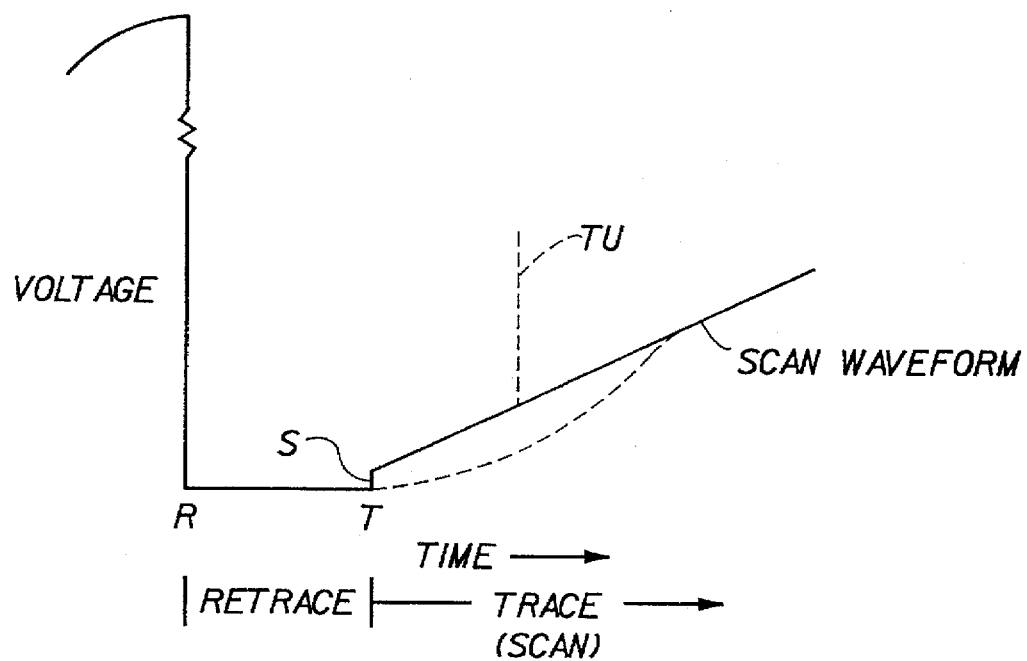
Figure 5:
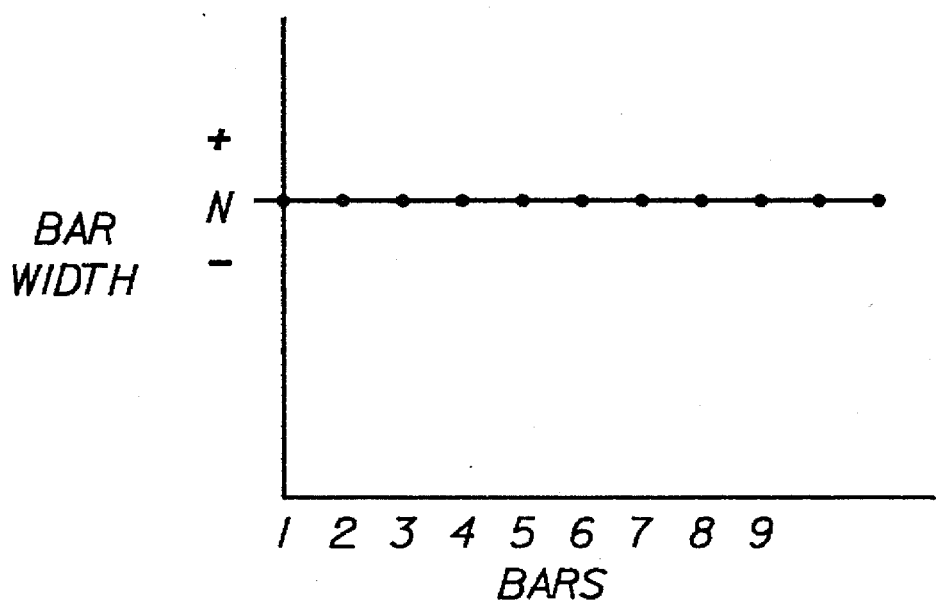

Surprisingly, however, a simple and effective solution to this problem has been discovered that involves, as seen in FIG. 3, introducing a step perturbation (S) in the scan waveform at the beginning (T) of the scan interval during the final stage of the blanking interval, but after the conclusion of the retrace interval. It has been found that the addition of this step increment to the scan drive waveform (SW), with proper polarity and amplitude, has the effect of pump starting the drive circuits, notably the power operational amplifier 26 and causes the initial transients to be sufficiently settled by the time the beam is unblanked at the start of useful scan point TU to create a highly accurate linear scan during the useful scan (trace) as illustrated in the scan graph of FIG. 5. The step value is readily added to the scan waveform by suitable programming of the LUT 18 to add the step value to the digital scan current values stored in the LUT. In the case of the lagging distortion in the waveform (SW"), the proper polarity is achieved by adding the step value as a positive value in the LUT. Appropriate amplitude is determined empirically by measuring the results of a series of step values using the bar width vs. time interval technique described above until the appropriate linear scan characteristic is realized. Once achieved, it has been found that the added step value is effective to achieve the desired degree of linear scan accuracy universally across all display systems of the same design, assuming general compliance with stated tolerance characteristics of the circuits in the design. This was not found to be the case when using the prior art programmed compensating values technique described above.

It will be appreciated that a complete CRT image display system would involve both a fast scan circuit, i.e. high frequency line scan in an image raster scan, as well as a slow scan circuit, i.e. low frequency page scan in the image raster. In TV raster terminology, these would correspond to horizontal and vertical scans, respectively. The step adjustment technique described herein is equally applicable to both scan functions although, in practice, it is most advantageous in the horizontal (fast) scan since the distortion introduced by the operational scan amplifier is most noticeable at the higher frequency of the horizontal scan.

Figure 6:
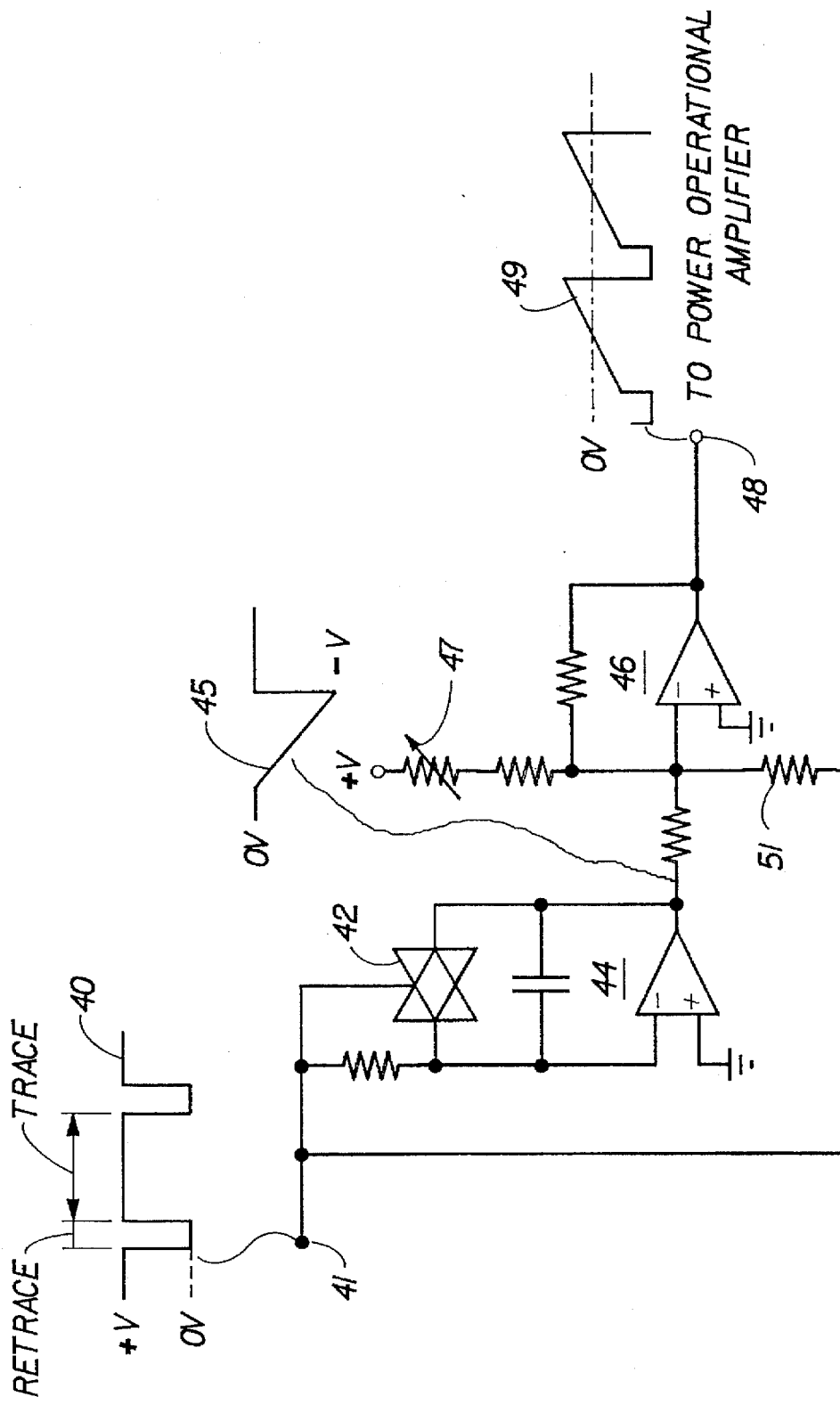
FIG. 6 is a schematic block diagram of an analog linear scan control in accordance with an alternative embodiment of the invention.

While the embodiment of FIG. 1 involves a digital scan system, the invention is equally applicable to analog scan circuits. In FIG. 6, there is shown an analog scan waveform drive circuit wherein an input scan sync signal 40 is applied to input terminal 41. This signal drives an integrator circuit 44 to produce a ramp signal wave form 45. Input signal 40 also drives a reset switch 42 to reset the integrator to 0 v during retrace between each scan line. The width of each negative-going pulse in signal 40 is equal to the duration of the retrace interval. The positive-going transition of each pulse is applied through an inverting amplifier 50 to introduce a negative step increment to waveform 45. A centering control potentiometer 47 is set to center the scan portion of the waveform on a 0 v level and the combined waveform is then inverted and amplified in inverting amplifier circuit 46 to produce the scan drive waveform 49 at output terminal 48 which feeds a power operational amplifier coupled to a CRT deflection yoke (not shown). The amplitude of the step injected into the waveform at the input to inverting amplifier 46 is determined primarily by the value of coupling resistor 51. Ideally, the increment added to the scan waveform to achieve elimination of the effects of distortion during initial scan would be an instantaneous increase to the desired step level. However, it will be appreciated that ideal step waveforms are difficult to achieve in practice and, consequently, an incremental increase in substantially the form of a step increase would be within the scope of the invention which can be determined by the effect of the incremental increase on the linearity of the scan during the initial scan interval.

Moreover, the embodiments described above involve the use of a power operational amplifier to drive the CRT beam deflection apparatus. It will be appreciated that other drive amplifier circuits may be used to drive the deflection apparatus and which have similar transient characteristic problems that can be eliminated by use of the present invention. Accordingly, it is within the scope of this invention to employ the step increment change to the input drive waveform with any deflection amplifier drive circuit exhibiting the "start-of-trace" distortion described herein. An example of another deflection drive amplifier for which the invention may be advantageously used is a pulse width modulation amplifier circuit.

The invention has been described with reference to one or more preferred embodiments. However, it will be appreciated that variations and modifications can be effected by a person of ordinary skill in the art without departing from the scope of the invention.

PARTS LIST

10 CRT image display system
11 scan waveform generating circuit
12 scan clock
14 fast scan sync supply
16 fast scan counter
18 fast scan lookup table (LUT)
20 digital to analog converter
22 current to voltage converter
24 low pass filters
26 power operational amplifier circuit
30 deflection yoke fast scan winding
32 CRT
40 input scan sync signal
41 input terminal
42 reset switch
44 integrator circuit
45 ramp signal
46 inverting amplifier
47 centering control potentiometer
48 output terminal
49 scan drive waveform
50 inverter
51 step signal coupling resistor

What is claimed is:

1. An improved linear fast scan control circuit for a CRT display system having a deflection drive analog amplifier circuit responsive to an input signal having scan and retrace intervals for generating an output deflection signal for driving a deflection yoke of a CRT display wherein initial scan position is subject to a nonlinear scan distortion resulting from transient response characteristics of the deflection drive amplifier circuit; the improvement comprising;

means for supplying a substantially step increase signal to the input signal to said deflection drive analog amplifier circuit at the beginning of said scan interval after conclusion of the retrace interval, the step signal being of an amplitude and polarity that substantially eliminates said nonlinear scan distortion.

2. The scan control circuit of claim 1 wherein said CRT display system comprises a digital signal drive having a lookup table with digital values therein which control incremental advance of a CRT beam during a scan interval and wherein said lookup table includes an incremetal step increase value to thereby introduce said step signal at the start of said scan interval.

3. The scan control circuit of claim 1 wherein said CRT display system comprises an analog input signal drive having a ramp generator circuit scan waveform drive signal and wherein said supply means includes an analog circuit for adding an analog step increase signal to the scan waveform drive signal prior to application of the scan waveform to said deflection drive amplifier circuit.

4. The scan control circuit of claim 1 wherein said deflection drive amplifier circuit is a power operational amplifier circuit.

5. The scan control circuit of claim 1 wherein said deflection drive amplifier circuit is a pulse width modulation amplifier circuit.

6. A method of Generating a highly accurate linear scan in a CRT image display system having a fast scan deflection drive amplifier used to drive fast scan deflection apparatus in the CRT, the method comprising the step of supplying to the deflection amplifier an input scan drive waveform having a retrace interval and a scan interval, the input scan waveform being supplied with s substantially step increase at the beginning of the scan interval after the conclusion of the retrace interval, the polarity and amplitude of the step increase being such as to substantially eliminate distortion of the linear scan during initial stages of the scan interval.

7. Apparatus for generating a linear scan in a CRT image display system comprising:

a CRT display having means for generating an electron beam and beam deflection apparatus;

fast scan deflection drive amplifier means for driving said beam deflection apparatus, said fast scan deflection drive amplifier means introducing distortion during initial stages of the linear scan;

means for supplying an input signal defining a retrace interval and a scan interval;

scan waveform generating means responsive to said input signal for generating a scan waveform signal and supplying said scan waveform signal to said deflection drive amplifier, said scan waveform generating means including step means for introducing a substantially step increment in the scan waveform at the beginning of the scan interval after conclusion of the retrace interval, said step increment being of a polarity and amplitude such as to substantially eliminate said distortion in said linear scan during initial stages of the scan interval.

8. The apparatus of claim 7 wherein said scan waveform generating means comprises a lookup table programmed with digital values used to generate said scan waveform and said step means includes digital values in said lookup table added to said digital values used to generate the scan waveform.

9. The apparatus of claim 7 wherein said scan waveform generating means comprises an analog ramp generator circuit a ramp signal and said step means comprises a circuit for supplying an analog step increase signal to said ramp generator to introduce an analog step value signal to ramp signal.

* * * * *